United States Patent Office 3,389,089
Patented June 18, 1968

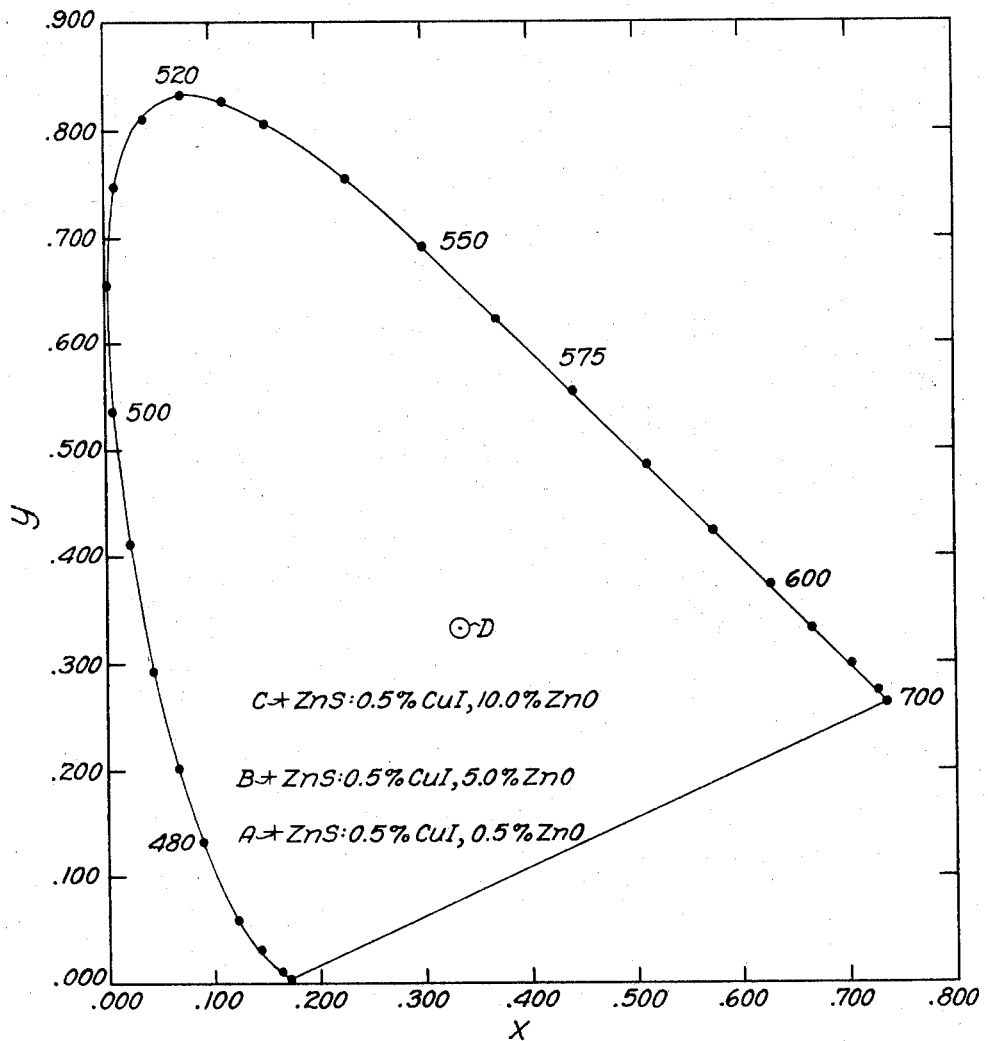

3,389,089
BLUE ELECTROLUMINESCENT PHOSPHOR AND
METHOD FOR ITS PRODUCTION
Ivie L. Smith, Cleveland, Ohio, assignor to General
Electric Company, a corporation of New York
Filed Jan. 2, 1964, Ser. No. 335,019
6 Claims. (Cl. 252—301.6)

This invention relates to luminescent materials or phosphors and more particularly to an electroluminescent zinc sulfide type phosphor emitting blue light under electric field excitation.

Electroluminescent posphors may be used in electroluminescent lamps or cells wherein a thin layer of phosphor which may be dispersed in a suitable dielectric medium is sandwiched between a pair of conducting plates at least one of which transmits light. The lamp is in the nature of a luminous capacitor, and when an alternating voltage is applied across the plates, the phosphor emits light which escapes through the transparent plate.

It is well-known that zinc sulfide phosphors can be made with electroluminescent emission peaking in the blue region of the spectrum. However, the previous methods of preparation have yielded phosphors either with good brightness and good particle size but poor maintenance of light output or with good maintenance of light output but low brightness and particles too large for direct use in many applications. Furthermore, the previous methods of preparation of blue iodide electroluminescent phosphors have required complex and expensive processing. Because of the fluxing action of the coactivator compounds, the previous methods have involved two lengthy firing steps with particle comminution between the two steps. The first step has been to grow crystals of the zinc sulfide matrix itself along with the incorporation of the activator and coactivator at the same time; the second step has been a lower temperature heat treatment designed to remove the damage to luminescence caused by the comminution. During this second step the particles do not substantially grow in size.

Accordingly, the general object of the present invention is to provide an improved method for producing blue emitting electroluminescent zinc sulfide phosphors.

Further objects of the invention are to provide phosphors having relatively good brightness and improved maintenance of light output with particles in size ranges suitable for usual applications, and to provide economical method for preparing such phosphors.

In accordance with the invention, I have found that blue-emitting, copper-activated, iodide-coactivated zinc sulfide phosphors of proper particle size can be prepared in a single firing step by employing zinc oxide in the batch to prevent excessive particle growth. The phosphors were prepared by firing a basic mixture of zinc sulfide, zinc oxide, nad cuprous iodide at a high temperature in a neutral atmosphere, then washing to remove the excess compounds from the product. Thus, the method of the present invention involves a one-step firing during which the phosphor particles are grown and the activators and coactivators are incorporated into the lattice structure. Phosphors prepared in accordance with the prescribed methods have average particle sizes of 5 to 15 microns and provide blue light of equal or greater brightness at equal chromaticity with as much as 600% improvement in maintenance relative to phosphors prepared by prior methods.

FIGURE 1 is an I.C.I. diagram illustrating graphically the chromaticity with basic mixture composition variations in phosphors prepared according to the method of the invention.

A typical phosphor in accordance with the method of my invention may be prepared as follows: a mixture of zinc sulfide with minor proportions of zinc oxide, for instance 0.05 to 10% by weight, and cuprous iodide, for instance 0.15 to 0.74% by weight, is used. A preferred mixture consists of zinc sulfide with 0.50% by weight of zinc oxide and 0.50% by weight of cuprous iodide. The mixture is blended, for example by sifting through a silk screen or milling, and then fired for one or more hours at a temperature below the hexagonal-cubic transition point, preferably in the range of 850° C. to 950° C. in a stagnant air atmosphere. The duration of the firing time will depend on the batch size of the material being prepared and must be long enough to allow crystallite growth to take place throughout the bulk of the material, but will generally require about one hour or more. As is well known in the art, somewhat lower temperatures can be used with longer firing times and higher temperatures can be used with shorter firing times to achieve equivalent results. The basic limits on time and temperature combinations in the present instance are that the phosphors cannot be fired at temperatures high enough to cause phase transformations or at temperatures so low that the firing times required are uneconomical. The economics in the latter situation will depend on many diverse factors such as the availability of furnaces and cost of fuel at the location where the work is to be done.

A progressive increase in copper iodide addition to the phosphor crystals at first gives a blue emission color to the pnosphor and then, with more activator being added, causes the color of the phosphor to progressively change to a green. So too, a progressive increase in zinc oxide content causes the emission color of the phosphor to become more green. The particular composition limits specified herein have been chosen to achieve desirable combinations of fluxing action (which determines the resulting particle size) with blueness of color.

The firing may be done by placing the mixture in the inner one of a pair of close fitting silica tubes, the inner tube being inserted open end foremost within the outer. This allows any gases to be expelled and prevents air from diffusing back and causing excessive oxidation of the zinc sulfide. Silica trays or other containers could be used in an equivalent manner, provided any ambient oxygen-containing atmosphere is effectively excluded. In other words, the firing is done in a neutral atmosphere.

After cooling to room temperature, the fired material is washed in the usual fashion known in the art in dilute acid and in dilute cyanide solution. For instance, it may be washed in acetic acid solution to remove free zinc oxide and then rinsed thoroughly with deionized water. Next it may be washed in potassium cyanide solution and again rinsed thoroughly with deionized water. It may be then dried at a low temperature, for instance about 110° C., to complete the preparation.

The use of iodide salts rather than chloride or bromide salts for coactivation of copper activated zinc sulfide type phosphors is known to provide phosphors with better maintenance than obtained with the latter two types of salts. However, as heretofore processed, iodide salts in zinc sulfide firing mixtures cause excessive particle growth so that some means of comminution must generally be used before the phosphor is suitable for lamp application. Effective treatments for reducing particle size after the final heat treatment will usually also reduce brightness or maintenance or both due to effects not now fully understood but which may include surface effects of various types. Thus, prior processing methods have generally involved two heat treatments, one to grow the crystals from powder and to incorporate the copper iodide into the crystals, and the second, after comminution, to heal the damaged particles at a low enough temperature to avoid excessive particle growth. I have found that the presence of zinc oxide in mixtures of zinc sulfide and cuprous iodide inhibits the fluxing action of the iodide so that products may be obtained after a single heat treatment having suitable particle size ranges without further treatment, such as comminution.

The concentration of zinc oxide in the firing mixtures is quite critical. Increasing amounts of zinc oxide cause decreasing particle growth and at the same time produce a gradual shift in the phosphor color from blue to greenish blue to blue-green. Therefore, the amount of zinc oxide desired in the phosphor is that amount which will give the desired blueness while reducing the resultant particle size to the desired range. With much more than 10% zinc oxide, the phosphor can no longer be considered to be blue. Since relatively small oxide additions are quite effective in inhibiting excessive growth, phosphors with average particle sizes of 5 to 15 microns and blue emission are possible. This effect is depicted in the graph of the figure wherein the chromaticity points of three phosphors containing increasing zinc oxide additions are shown. Each of the phosphors contained zinc sulfide and 0.50% by weight cuprous iodide. The phosphor of point A on the graph also contained 0.50% zinc oxide, point B had 5.0% zinc oxide, and point C 10% zinc oxide. Point D is the locus of neutral white. Point C is in the greenish-blue region, while points B and A are both in the blue region, with B being closer to the green than is A.

A specific example of a suitable phosphor preparation in accordance with the prescribed method is as follows:

Twenty g. of zinc sulfide, 0.10 g. of zinc oxide, and 0.10 g. of cuprous iodide are mixed by sifting through 150 mesh silk sieve cloth. The mixture is then placed in the inner one of two telescoping silica tubes as previously described and fired for two hours at 900° C. in air. The phosphor is then washed in successive steps with acetic acid solution, water, potassium cyanide solution, and water; and then dried at 110° C.

Under electroluminescent excitation at 94 volts (RMS) per mil and 60 cycles per second in dry chlorinated biphenyl (Aroclor, described in publication O-P 115 of Monsanto Chemical Company), the phosphor gives a brightness of 1 foot-lambert. The chromaticity is as shown at point A for ZnS: 0.5% CuI, 0.5% ZnO in FIG. 1. The brightness maintenance is 600% of that of comparable prior art phosphors in terms of time to one-half maximum brightness.

A feature of the invention is the use of zinc oxide to inhibit excessive particle growth during preparation of blue-emitting iodide-coactivated zinc sulfide: copper phosphors so that products with good brightness, maintenance, and chromaticity may be used as obtained without the need for comminution either during or after preparation. In like manner, I do not know of any prior production or disclosure of such phosphors made by my methods.

The specific examples of the invention which have been described are intended as illustrative and not as limitative of the invention whose scope is to be determined by the appended claims. The weight percents stated herein are based on the weight of the zinc sulfide.

What I claim as new and desire to secure by Letters Patent of the United States is:

1. The method of preparing a blue electroluminescent zinc sulfide phosphor which comprises mixing ZnS with from 0.15 to 0.74% by weight of CuI, and from 0.05 to 10% by weight ZnO, and firing in a neutral atmosphere at a temperature in the range of from about 850° C. up to a temperature less than the hexagonal-cubic transition point for a period of time sufficient to allow crystallite growth throughout the bulk of the material.

2. The method of preparing a blue electroluminescent zinc sulfide phosphor which comprises mixing ZnS with from 0.15 to 0.74% by weight of CuI, and from 0.05 to 10% by weight ZnO, and firing in a neutral atmosphere at a temperature in the range of 850 to 950° C. for a period of time sufficient to allow crystallite growth throughout the bulk of the material.

3. The method of preparing a blue electroluminescent zinc sulfide phosphor which comprises mixing ZnS with from 0.15 to 0.74% by weight of CuI, and from 0.50 to 5.0% by weight ZnO, and firing in a neutral atmosphere at a temperature in the range of from about 850° C. up to a temperature less than the hexagonal-cubic transition point for a period of time sufficient to allow crystallite growth throughout the bulk of the material.

4. A method of preparing a blue electroluminescent zinc sulfide phosphor which comprises mixing ZnS with about 0.50% by weight of CuI, about 0.50% by weight ZnO, and firing in a neutral atmosphere at a temperature in the range of 850 to 950° C. for a period of time sufficient to allow crystallite growth throughout the bulk of the material.

5. A method of preparing a blue electroluminescent zinc sulfide phosphor which comprises mixing ZnS with about 0.50% by weight of CuI, about 5.0% by weight ZnO, and firing in a neutral atmosphere at a temperature in the range of 850 to 950° C. for a period of time sufficient to allow crystallite growth throughout the bulk of the material.

6. A method of preparing a blue electroluminescent zinc sulfide phosphor which comprises mixing ZnS with about 0.50% by weight of CuI, about 10% by weight ZnO, and firing in a neutral atmosphere at a temperature in the range of 850 to 950° C. for a period of time sufficient to allow crystallite growth throughout the bulk of the material.

References Cited

UNITED STATES PATENTS 2,807,587  9/1957  Butler et al. _____ 252—301.6

FOREIGN PATENTS 492,923  9/1938  Great Britain.

OTHER REFERENCES

Petrillo et al.: Method for Preparing Small-Particle Zinc Sulfide Electroluminescent Phosphor RCA Technical Notes RCATN No. 162, published by RCA Laboratories, Princeton, N.J.

TOBIAS E. LEVOW, *Primary Examiner.*

HELEN M. McCARTHY, *Examiner.*

R. D. EDMONDS, *Assistant Examiner.*